United States Patent [19]
Dent

[11] Patent Number: 5,831,977
[45] Date of Patent: Nov. 3, 1998

[54] SUBTRACTIVE CDMA SYSTEM WITH SIMULTANEOUS SUBTRACTION IN CODE SPACE AND DIRECTION-OF-ARRIVAL SPACE

[75] Inventor: Paul W. Dent, Pittsboro, N.C.

[73] Assignee: Ericsson Inc., Research Triangle Park, N.C.

[21] Appl. No.: 706,493

[22] Filed: Sep. 4, 1996

[51] Int. Cl.⁶ ...................................................... H04J 13/00
[52] U.S. Cl. ......................... 370/335; 375/208; 375/347
[58] Field of Search ..................................... 370/320, 335, 370/342, 441, 479; 379/200, 208, 347

[56] References Cited

U.S. PATENT DOCUMENTS

| | | |
|---|---|---|
| 5,048,059 | 9/1991 | Dent . |
| 5,151,919 | 9/1992 | Dent . |
| 5,187,675 | 2/1993 | Dent et al. . |
| 5,218,619 | 6/1993 | Dent . |
| 5,305,349 | 4/1994 | Dent . |
| 5,353,352 | 10/1994 | Dent et al. . |
| 5,357,454 | 10/1994 | Dent . |

FOREIGN PATENT DOCUMENTS

| | | |
|---|---|---|
| 491 668 | 6/1992 | European Pat. Off. . |
| WO95/19078 | 7/1995 | WIPO . |

OTHER PUBLICATIONS

Liu, T., "The Modular Covariance Adjustment Adaptive Array for CDMA Wireless Communications," *IEEE Internatl Conference on Acoustics, Speech, and Signal Processing*, Apr. 1993, pp. 180–183.

*Primary Examiner*—Melvin Marcelo
*Attorney, Agent, or Firm*—Burns, Doane, Swecker & Mathis, L.L.P.

[57] ABSTRACT

A communications system is disclosed comprising a plurality of mobile stations and an improved base station for receiving signals from said mobile stations and decoding information-bearing signals transmitted therefrom. An antenna comprising antenna elements disposed around a support structure receives signals transmitted from the plurality of mobile stations and generates output signals from each antenna element. Convertors amplify, filter and convert signals from each of the antenna elements into a corresponding number of converted signals for processing. Storage devices temporarily store a number of samples of the converted signals. Processors iteratively process and reprocess the stored samples successively to decode the information from each of the mobile stations in turn. The processing provided by the processors identifies from the stored samples an information symbol transmitted by one of the mobile stations thereby decoding the information-bearing signal, and subtracts values dependent on the identified information symbol from the stored samples thereby reducing interference between the just-decoded signal and the signal to be decoded at a subsequent iteration.

39 Claims, 5 Drawing Sheets

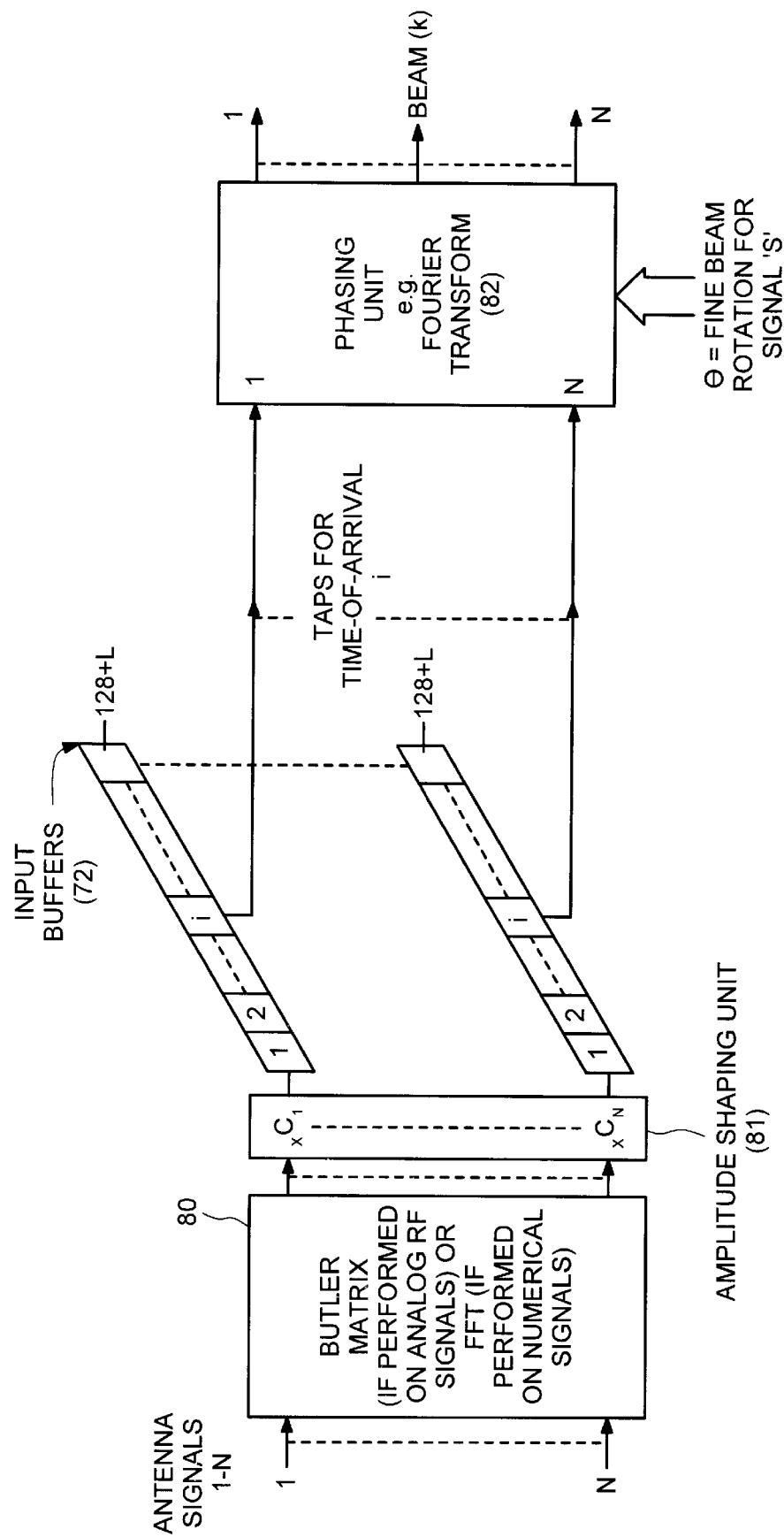

SUBTRACTIVE CDMA SYSTEM WITH SIMULTANEOUS SUBTRACTION IN CODE SPACE AND DIRECTION-OF-ARRIVAL SPACE

FIELD OF THE INVENTION

The invention relates to a communication system and provides improved capacity in cellular wireless telephone systems using Code Division Multiple Access methods together with base station receiving systems employing antenna arrays.

BACKGROUND OF THE INVENTION

The cellular telephone industry has made phenomenal strides in commercial operations in the United States and throughout the reset of the world. Growth in major metropolitan areas has far exceeded expectations and is outpacing system capacity. If this tend continues, the effects of rapid growth will soon even reach the smallest markets. Innovative solutions are required to meet these increasing capacity needs as well as maintain high quality service and avoid rising prices.

Currently, channel access is achieved using Frequency Division Multiple Access (FDMA), Time Division Multiple Access (TDMA) and Code Division Multiple Access (CDMA) methods. With FDMA or TDMA systems or hybrid FDMA/TDMA systems, the goal is to insure that two potentially interfering signals do not occupy the same frequency at the same time. In contrast, CDMA allows signals to overlap in both time and frequency. Thus, all CDMA signals share the same frequency spectrum. In either the frequency or the time domain, the multiple access signals appear to be on top of each other. In principal, the informational data stream to be transmitted is impressed upon a much higher bit rate data stream generated by a pseudo-random code generator. The informational data stream and the high bit rate data stream are combined by multiplying the two bit streams together. This combination of the higher bit rate signal with the lower bit rate data stream is called coding or spreading the informational data stream signal. Each informational data stream or channel is allocated a unique spreading code.

A plurality of coded information signals are transmitted on radio frequency carrier waves and jointly received as a composite signal at the receiver. Each of the coded signals overlaps all of the other coded signals, as well as noise-related signals, in both frequency and time. By correlating the composite signal with one of the unique codes, the corresponding information signal is isolated and decoded.

There are a number of advantages associated with CDMA communication techniques. The capacity limits of CDMA-based cellular systems are projected to be up to twenty times that of existing analog technology as a result of the properties of a wide band CDMA system, such as improved coding gain modulation density, voice activity gating, sectorization and reuse of the same spectrum in every cell. CDMA is virtually immune to multi-path interference, and eliminates fading and static to enhance performance in urban areas. CDMA transmission of voice by a high bit rate decoder insures superior, realistic voice quality. CDMA also provides for variable data rates allowing many different grades of voice quality to be offered. The scrambled signal format of CDMA completely eliminates cross talk and makes it very difficult and costly to eavesdrop or track calls, insuring greater privacy for callers and greater immunity from air time fraud.

U.S. Pat. No. 5,151,919 to applicant and commonly assigned and is hereby incorporated by reference describes a Code Division Multiple Access system in which overlapping signals coded using different access codes are received at a receiving system and decoded in order of decreasing signal strength, subtracting stronger signals after they are decoded and before attempting decoding of weaker signals. The patent discloses a preferred method of subtraction involving transforming the received signal to a symbol-space domain to identify the symbol most likely transmitted, and then setting to zero the value identified with the symbol in the symbol-space domain, thus removing that signal. An inverse transform returns the residual values to the original domain for iterative processing by performing a transform to the symbol-space of the next signal to be decoded, and so-on.

U.S. Pat. No. 5,353,352 to Dent et al. and commonly assigned discloses how to form access codes suitable for discriminating different mobile transmissions on the same frequency, suitable for use with subtractive demodulation. U.S. Pat. No. 5,353,352 is also hereby incorporated herein by reference in its entirety.

U.S. Pat. No. 5,218,619 also to applicant and commonly assigned is also hereby incorporated by reference in its entirety herein, and describes an improved method of subtractive demodulation wherein a second subtraction of a previously subtracted signal is performed after subtracting other intervening signals, in order to cancel residual errors left from the first subtraction caused by the original presence of the intervening signals.

Neither of the above-incorporated patents discloses performing a two-dimensional transform from an antenna-space/time domain to a symbol-space/direction-of-arrival domain. The above-incorporated patents are relied upon to provide background art to the technique subtraction demodulation of coded signals and for performing signal subtraction by nulling in a transform domain.

U.S. patent application Ser. No. 08/179,953 is also hereby incorporated by reference in its entirety herein and discloses various novel ways of employing an antenna array for receiving multiple signals from different directions using the same frequency bandwidth. Mathematical transforms involving matrix operations are disclosed, whereby a signal received from a given direction may be discriminated while simultaneously nulling interfering signals received from other directions. Thus, several signal transmissions may share the same frequency bandwidth provided that the transmitters' directions relative to the receiving antenna are sufficiently different. When the directions of two transmitters almost coincide, the matrix solution becomes undefined and the transmitters can not be discriminated. An alternate method is disclosed for such cases, whereby, instead of attempting to separate signals by matrix-combining the signals from the antenna elements, a symbol received from each transmitter is hypothesized, and the expected corresponding received signals at each antenna element are computed using direction of arrival estimates. The sum of signals expected at each antenna element is compared with the actual value at each antenna element and the squared differences used to form a metric indicative of the probability that the symbol hypotheses are correct. A maximum likelihood processor then identifies that hypothesis that has highest probability of being correct. The complexity of such a maximum likelihood processor is proportional to two-to-the-power of N, where N is the number of overlapping signals.

U.S. patent application Ser. No. 08/393,809 is also hereby incorporated by reference in its entirety herein and discloses using an array of antenna elements to receive signals from a plurality of transmitters using the same frequency with a maximum likelihood processor operating sequentially along a spatial dimension, being the dimension along which antenna elements are spaced, the maximum likelihood processor complexity being much less than proportional to $_2N$ and proportional instead to $2^M$, where M is only as large as the subset of antenna elements that receive significant signals strengths from the same transmitter. Thus, the antenna element signals are not transformed into directively received signals corresponding to different transmitter directions, but rather different transmitter signals are transformed into expected antenna element signals.

The above-incorporated patents are relied upon to supply background on the state of the art using antenna arrays for improved reception of multiple signals using the same frequency channel.

The invention to be described below is an improvement upon the above prior art when utilizing subtractive demodulation of coded signals simultaneously with the use of antenna arrays to provide directive discrimination. The new invention differs from using prior art antenna arrays to provide directive beams and then processing the signal from a directive beam using subtractive demodulation. Such a combination is considered anticipated in the incorporated references. In the new invention, when a signal is decoded and subtracted, it is subtracted from all antenna element signals and therefore vanishes not only from the directive beam it is received in, but also vanishes from all other beams formed using the same antenna elements, even when those other beams have substantial spatial overlap with the signal's beam. Thus the invention provides advantages not found using a combination of prior art devices, which advantages translate to greater communications capacity or quality.

SUMMARY OF THE INVENTION

Mobile phones transmit coded signals to at least one base station. The base station is equipped with an antenna array for receiving signals from a plurality of mobiles stations lying in different directions, the signals transmitted by the mobile stations comprising information symbols chosen from an orthogonal alphabet, further scrambled using an access code.

Signals from the antenna array elements comprising weighted sums of the signals transmitted by different mobile stations are amplified, downconverted filtered and digitized to form corresponding streams of numerical samples that are fed to a processor including means for storing numerical samples and means for performing arithmetic operations on stored samples. The processor arranges samples received sequentially in time from different antenna elements in a two-dimensional array, one dimension corresponding to the different antenna elements and the other dimension corresponding to time, i.e. sequence of reception, hereinafter referred to as the space/time domain.

The numerical samples are unscrambled using the access code of a first mobile transmitter and the processor then computes a two-dimensional transform of the two-dimensional array of unscrambled samples to produce a two-dimensional array of result-bins, wherein bins along one dimension correspond to the symbols in the alphabet and bins in the other dimension correspond to combinations of samples received via different antenna elements thus providing directive receiving beams in different directions, the result-bins hereinafter referred to as the code/space domain.

The processor identifies the result-bin containing the greatest value and thereby identifies a symbol received from the first mobile and a direction of reception. The value of the bin is then set to zero and an inverse two dimensional transform is performed to transform the residual bin values back to the space/time domain, the just-identified signal having been subtracted out. The samples are then rescrambled using the first mobile's access code.

The process then repeats starting with descrambling using a second mobile's access code, and so forth, until a symbol has been decoded from all mobile transmitters. The entire process then repeats for sequential symbol periods to construct a sequence of received symbols from each mobile transmitter.

The access codes of the first mobile, second mobile etc. preferably belong to mobiles selected in order of decreasing signal strength such that the strongest mobile signals are decoded and subtracted out before decoding weaker mobile signals, thereby providing improved discrimination of overlapping signals by both access code and direction of arrival, and thus allowing a greater number of transmissions to share the same frequency bandwidth.

According to one embodiment of the present invention, a communications system is disclosed comprising a plurality of mobile stations and an improved base station for receiving signals from said mobile stations and decoding information-bearing signals transmitted therefrom. An antenna means comprising antenna elements disposed around a support structure receives signals transmitted from said plurality of mobile stations and generates output signals from each antenna element. Conversion means amplify, filter and convert signals from each of said antenna elements into a corresponding number of converted signals for processing. Storage means temporarily store a number of samples of said converted signals. Processing means iteratively process and reprocess said stored samples successively to decode said information from each of said mobile stations in turn. The processing provided by said processing means identifies from said stored samples an information symbol transmitted by one of said mobile stations thereby decoding said information-bearing signal, and subtracts values dependent on said identified information symbol from said stored samples thereby reducing interference between the just-decoded signal and the signal to be decoded at a subsequent iteration.

According to another embodiment of the present invention, a communications system is disclosed comprising a plurality of mobile stations and an improved base station for receiving signals transmitted from said mobile stations each with the aid of an assigned access code and for decoding information symbols belonging to an allowed alphabet of symbols encoded in said transmissions. Antenna means comprising antenna elements disposed around a support structure receive signals transmitted from said plurality of mobile stations and generate output signals from each antenna element. Conversion means amplify, filter and convert signals from each of said antenna elements into a corresponding number of converted signals for processing. Storage means temporarily store a number of samples of said signals converted from each of said antenna elements at successive instants in time. Two-dimensional numerical transform means process said stored samples using one of said access codes assigned to a first one of said mobile stations to produce a two-dimensional array of transformed samples, said transformed samples lying along one dimension of said two-dimensional array corresponding to different possible directions of arrival of signals at said base station transmitted by said first mobile station and transformed samples lying along the other dimension of said two-dimensional array corresponding to correlations with different ones of said information symbols in an allowed alphabet of symbols.

According to another embodiment of the present invention, a communications system is disclosed comprising a plurality of mobile stations and an improved base station for receiving signals transmitted from said mobile stations each with the aid of an assigned access code and for decoding information symbols belonging to an allowed alphabet of symbols encoded in said transmissions. Antenna means comprising antenna elements disposed around a support structure receive signals transmitted from said plurality of mobile stations and generate output signals from each antenna element. Conversion means amplify, filter and convert signals from each of said antenna elements into a corresponding number of converted signals for processing. Storage means temporarily store a number of samples of said signals converted from each of said antenna elements at successive instants in time. Two-dimensional numerical transform means process said stored samples using one of said access codes assigned to a first one of said mobile stations to produce a two-dimensional array of transformed samples, said transformed samples lying along one dimension of said two-dimensional array corresponding to different possible directions of arrival of signals at said base station transmitted by said first mobile station and transformed samples lying along the other dimension of said two-dimensional array corresponding to correlating samples with different ones of said information symbols in an allowed alphabet of symbols using a prescribed time-shift between the samples correlated and said information symbols. Means repeat said two-dimensional transform for a plurality of said time-shifts corresponding to delayed reception of signals from said first mobile station corresponding to delayed echoes of said signals caused by signals reflection from objects in the propagation path.

BRIEF DESCRIPTION OF THE DRAWINGS

These and other features and advantages of the invention will be readily apparent to one skilled in the art from the following written description, used in conjunction with the drawings, in which:

FIG. 5 illustrates Butler Matrix/Fourier Transform formulation of beam-forming according to one embodiment of the present invention.

DETAILED DESCRIPTION

Figure 1:
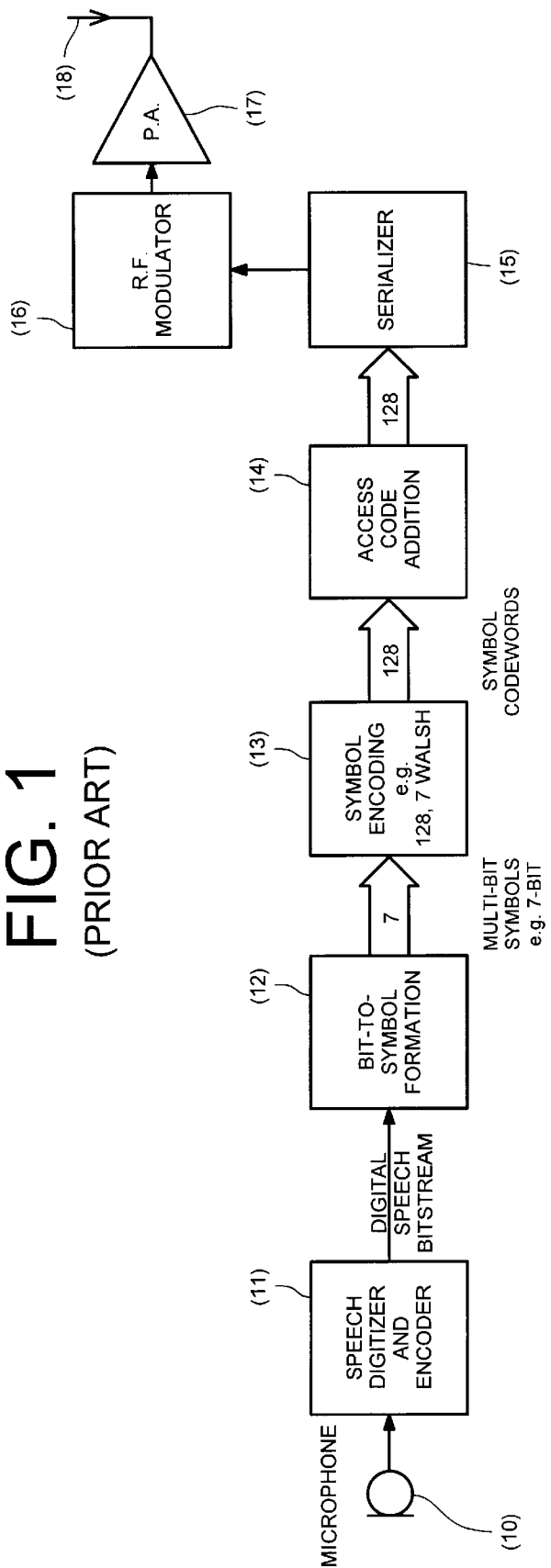
FIG. 1 illustrates a prior art transmitter for use with the present invention.

FIG. 1 illustrates a simplified block diagram of the type of mobile transmitter the current invention is designed to decode. The transmitter is a prior art transmitter of the same form disclosed in the incorporated documents.

A speech signal from a microphone 10 is digitized and compressed using a speech coding algorithm in a speech encoder 11 to produce a digital bitstream representative of the speech signal. Existing digital cellular systems have compressed the speech signal to bitrates of 13KB/s (GSM) and 7KB/s (IS54) respectively, and at the state of the art acceptable speech quality can be maintained even with speech coders that reduce the bitrate to 3.6KB/s.

The bitrate from the speech encoder may be increased again by the use of error correction encoding. Most redundancy is added to protect the most perceptually important bits while the least perceptually important bits may not be coded at all. Such coding, if any, is considered to be part of block 11 in FIG. 1. The resulting encoded digital speech from block 11 is formed into multi-bit symbols for spread-spectrum encoding in block 13. For example, 7-bit blocks can be formed and each of the 128 possible 7-bit patterns is represented by one of 128 orthogonal Walsh-Hadamard codes, thus expanding the bitrate further by a factor of 128/7. When such block-orthogonal spread-spectrum symbol coding is employed, a preferred form of error correction coding within speech encoder 11 is Reed-Solomon coding, which is adapted to code multi-bit symbols. The combination of Reed-Solomon coding and Walsh-Hadamard coding can be done in a variety of ways to produce unequal coding for the most and least perceptually significant bits. For example, a Reed-Solomon code constructed on a GF27 can code a block of 7-bit important symbols to produce an RS-coded block containing a greater number of symbols. A "Galois Field" or GF is the set of all integers from 0 to some maximum that is a closed set under some modulo combinatorial operations. A GF27 (two to the power of seven or $GF2^7$) means all integers from 0 to 127, i.e., all 7-bit binary codes. If two of these are combined by 7-bit wide XOR (modulo-2 addition) an other 7-bit value in the set results, so the set is "closed" under the combinatorial operation "XOR". The remaining less important symbols can be formed into 7-bit blocks but not RS coded. The RS-coded and the non-RS-coded 7-bit symbols are then output from the encoder 11 to the Walsh-Hadamard encoder 13, the bit-to-symbol formation 12 having already been performed inside the encoder 11 in this case, at least for the RS-coded symbols.

An alternative unequal coding method is to form important bits into, for example, 5-bit symbols which are then RS-coded on a GF2**5 to form a larger block of RS-coded 5-bit symbols. Two bits of lesser importance are then added to each 5-bit RS symbol to obtain 7-bit symbols which are then submitted to Walsh-Hadamard coder 13 to obtain 128-bit codewords.

To provide privacy for individual conversations, encryption can be added either in block 11 or in block 12 as described in U.S. Pat. No. 5,353,352 which was incorporated herein by reference above.

Different mobiles produce Walsh-Hadamard codes from the symbol encoder 13 belonging to the same set of 128 codes, and thus to aid discrimination between different mobiles, an access code is bitwise modulo-2 combined with the codewords at block 14, as described in U.S. Pat. No. 5,353,352. The access codes are preferably chosen such that an access-coded codeword of one mobile transmitter is maximally different from all 128 possible access-coded codewords produced by any other mobile transmitter.

For simplicity, details that are not material to the current application are omitted from FIG. 1, such as addition of signalling information to speech information, source of encryption keys, and overall control of the transmitter by a control processor is not shown.

The access-coder 14 produces 128 bits out that are converted to a serial stream if necessary for modulating the radio-frequency carrier by a serializer 15. The bit stream is applied to a modulator 16 to produce a modulated RF signal which is then amplified to a transmit power level in a power amplifier 17 for transmission using an antenna 18. For simplicity, the corresponding mobile receiver circuits that use the same antenna for receiving are not shown.

Figure 2:
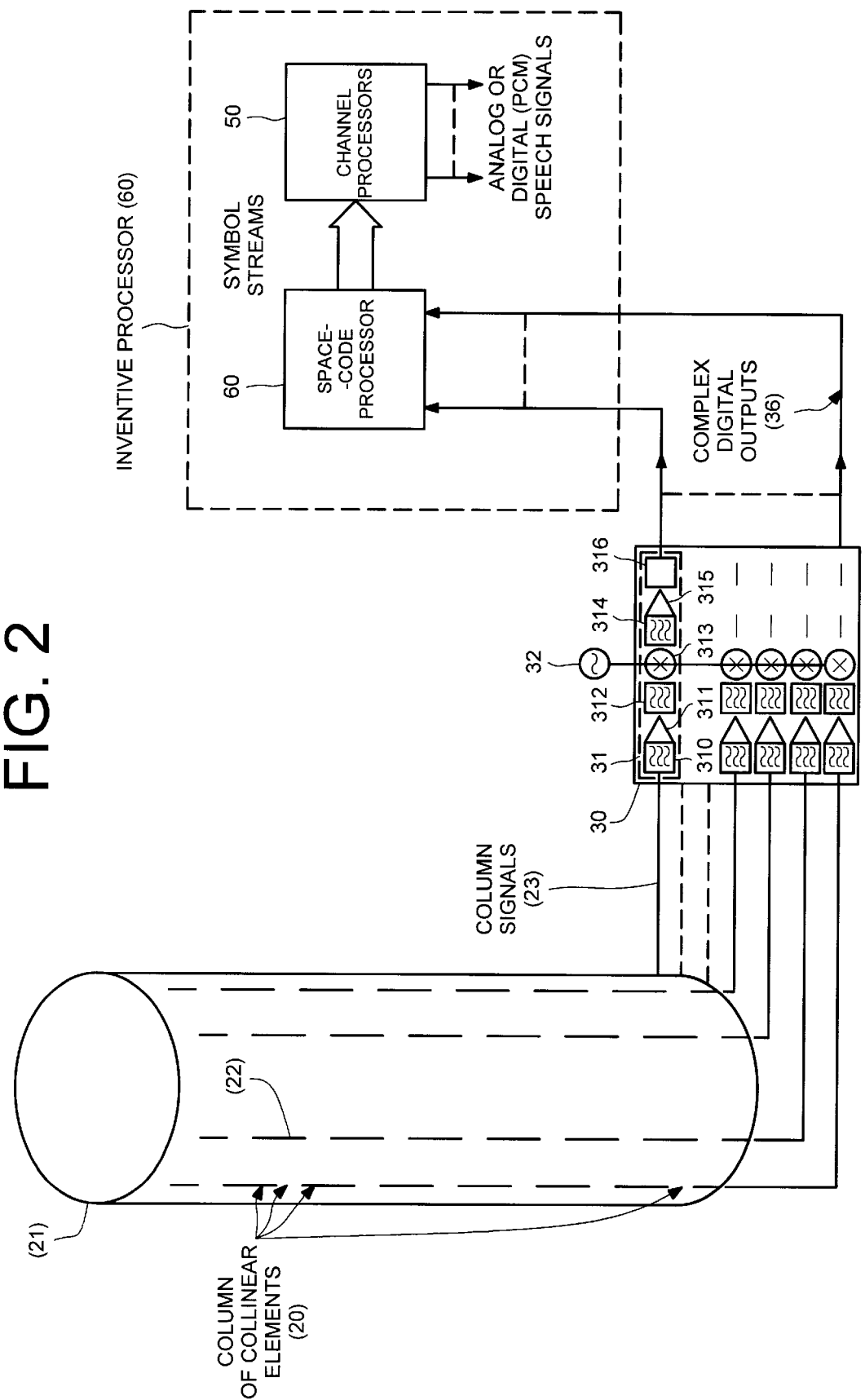
FIG. 2 illustrates an array antenna for use with the present invention.

FIG. 2 illustrates the connection of a cylindrical antenna array 21, such as is described in U.S. patent application Ser. No. 08/179,953 which was incorporated herein by reference above, to the inventive processor 60 of the current invention.

Antenna elements 22 are arranged in collinear columns 20 and the columns 20 are disposed around a cylinder 21 atop an antenna mast at a cellular base station site. The elements of a column are coupled so as to form column signals 23 and each such collinear column exhibits directivity in the vertical elevation plane but a broad beamwidth in the horizontal (azimuth) plane. Each column signal is processed by a receiving channel 31 forming a bank of channels 30. Each channel 31 comprises for example a first RF filter 310; a low noise amplifier 311; a second RF filter 312; a downconvertor 313 using a common local oscillator 32; an Intermediate Frequency (IF) filter 314; an IF amplifier 315 and a complex AtoD convertor 316 to generate a stream of complex numerical samples 36 representative of the RF signal from each collinear column of elements.

The AtoD convertor can comprise quadrature downconversion using I,Q mixers and I,Q AtoD convertors, or alternatively can employ the logpolar digitization technique described in U.S. Pat. No. 5,048,059 which is hereby incorporated by reference herein.

The complex digital outputs 36 are then fed to the processor 60 which includes a space/code processor 40 to discriminate and output separate symbol streams received from each mobile transmitter (FIG. 1) and a bank 50 of individual traffic channel processor units to process the symbol streams for each traffic channel to regenerate speech signals, signalling and control information or user data such as fax or computer data signals.

Figure 3:
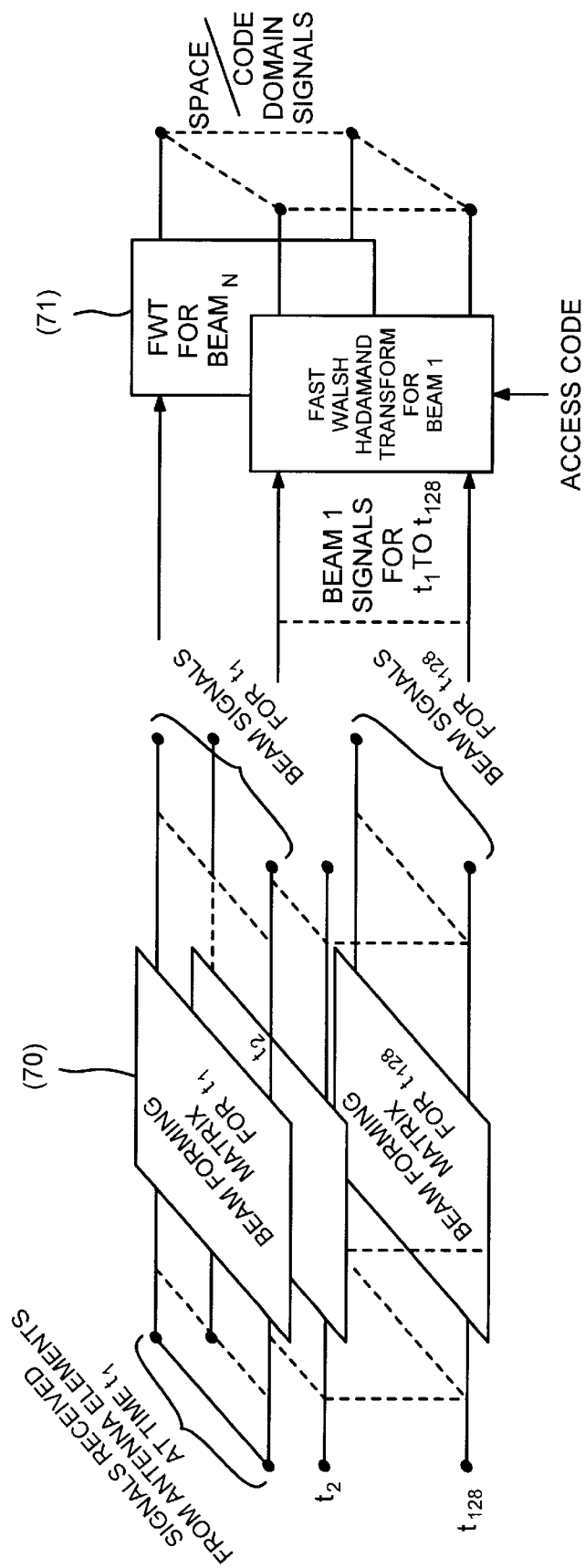
FIG. 3 illustrates a space/code processor according to one embodiment of the present invention.

FIG. 3 illustrates part of space/code processor 40 comprising a two-dimensional numerical transform. Signals received from the set of antenna columns at the same time (t1) form a row of input signals to a beamforming matrix 70 for t1. The set of antenna signals received at successive time instants t2,t3 . . . t128 are fed to a corresponding number of identical beamforming matrices 70. It shall be understood that all signals processed by the two-dimensional transform are complex numbers, having a real part and imaginary part each represented as fixed or floating point binary values. In general, fixed point representations are preferable as the hardware required to process fixed point numbers is less expensive.

The beamforming matrices compute a set of output signals each corresponding to having formed a directive beam in a particular direction in azimuth. The number of beams computed for each sampling instant t(i) is typically equal to the number of antenna columns, such that the beamforming matrix corresponds to multiplication of a row of input values by a square matrix of complex beamforming coefficients. Numerical beamforming and efficient methods therefor are described in U.S. patent application Ser. No. 08/568,664, entitled "Efficient Apparatus For Simultaneous Modulation and Digital Beamforming For an Antenna Array", which is hereby incorporated by reference herein in its entirety.

Through the beamforming matrix, a signal arriving from a particular direction corresponding to a beam direction is enhanced relative to signals arriving from other directions. The beamformer computes beams covering the ensemble of directions and so all signals are enhanced in one or another of the beams. As will be discussed below, the beamformer does not necessarily however compute beams for all signals at the same time, as it preferably makes fine beam direction adjustments individually for each mobile signal.

The beam signals for beam direction 1 computed for successive time instants t1,t2 . . . t128 form a 128-complex-valued input vector to Fast Walsh Hadamard Transform (FWT) processor 71 for beam 1 and likewise the set of signals for beam 128 computed for successive sampling instants t1 . . . t128 form the input vector to FWT processor 71 for beam N. The FWT processors for all other beams are also performed, yielding an array of 128×N two-dimensionally transformed results, the first dimension of the transform being antenna-element/beam-space and the second dimension being time/code-space. Each FWT processor transforms 128 input values to 128 output values and can be constructed using fully parallel logic to operate extremely rapidly, as described in U.S. Pat. No. 5,357,454 to applicant, which is hereby incorporated by reference in its entirety herein.

In FIG. 3, for simplicity, it is assumed that the operation of descrambling the set of 128 input values using an access code assigned to a particular mobile signal is included as the first step inside FWT processor 71. This step undoes the step performed by the corresponding scrambler 14 of FIG. 1. The access code is chosen first to be that assigned to a mobile transmitter previously identified with the strongest signal received at the base station. A symbol transmitted by that transmitter will result in a corresponding one of 128 FWT processor outputs from one of the N beam-associated FWT processors 71 being the largest output. The beam in question should not change rapidly between one symbol and the next, a period of typically a fraction of a millisecond, because the mobile transmitter does not circulate around the antenna array with such a huge angular velocity. Therefore the beam to use for identifying a transmitted symbol may be predicted from previous results, and after identification of the transmitted symbol, the value in the same symbol bin in other beams can be examined to determine if the signal is growing in another direction-bin; at some point, if the mobile transmitter is moving, the signal in another beam/direction-bin would become larger and then the beam for decoding that mobile would be changed. In an intermediate phase, when the mobile straddles two beams and thus produces similar results from two neighboring sets of 128 outputs, the weighted sum of the two sets of 128 outputs may be used for decoding the symbol.

Decoding a symbol comprises identifying the index of the largest of the 128 values of the above-mentioned sum, or of 128 FWT processor outputs of a single beam. This may be done extremely rapidly using fully parallel logic, as described in U.S. Pat. No. 5,187,675 which is hereby incorporated by reference in its entirety herein. Having identified the index of the largest value, that value is set to zero in the 128-value array for the beam (or beams, if more than one are summed) used for decoding. Thus, out of the 128×8 space/code domain values computed by the space/code processor, one value (or perhaps two) are set to zero. The remaining values are then inverse transformed using FIG. 3 in reverse, namely an inverse FWT is performed on columns of values, they are rescrambled using the same access code, and then rows of values are multiplied by a matrix inverse of the beamforming matrix to obtain 128×N values once more in the space/time domain.

Because the beam from which the signal was decoded was predicted in advance, it will be realized that beamforming matrices 70 did not need to compute beam signals for all the beams, but only for that in which the signal is predicted to be received strongest plus perhaps the beams lying on either side, in order to monitor for the signal crossing to an adjacent beam due to transmitter movement. The FWT processors 71 do not then have to be performed for the beam signals that are not computed. However, in order to be able to reverse the beamforming process 70, the number of output values computed must be equal to the number of input values, i.e. the beamforming matrix must be square and therefore information-lossless. However, it may be possible to simplify the matrix multiplication by using a matrix containing many zeros in rows corresponding to uncomputed beams, as long as the inverse of the matrix still exists and rows corresponding to the needed beams comprise the correct beamforming coefficients. Since completely different matrices and inverses would then need to be precomputed and stored for each signal direction, it may be better to use a single matrix and to not be concerned about the wasted effort in computing unneeded beams. The unneeded FWTs are still saved if the corresponding beams are not needed to decode a signal.

Now, the signals received from different mobile transmitters do not necessarily have their 128-sample symbol periods exactly aligned. Moreover, the signal sampling performed in the AtoD convertors 316 is not necessarily synchronous with the center or an optimum sampling point of every symbol. Indeed the signal from any particular mobile transmitter may be received with time-smear due to the phenomenon known as multipath propagation whereby reflections of the signal from tall buildings, hillsides and such are received with different delays that can be many sample-periods delayed, each delayed version of the signal being called a "ray". Sample timing misalignment, whereby sampling occurs between two code chips, also gives rise to ray-splitting, whereby a correlation is observed for the two chip-shifts straddling the correct sampling point. The aforementioned references explain how to handle all these effects by computing FWTs also for 128-sample vectors that are shifted in time to account for the delay of a particular echo. FWT vectors for each shift are added with complex weights accounting for the phase shift and attenuation of each path to obtain a combined signal for decoding. The chip-shifts that are selected for combining using complex weighted addition are called "RAKE taps", and the coefficients are called "RAKE coefficients". The combining of FWTs with complex weights may be simplified by restricting the RAKE coefficients to comprise real and imaginary parts that are inverse powers of two, which involves an acceptable loss compared to using exact complex weighting values. Multiplications by inverse powers of two are simple to implement by time-delaying bit-serially presented binary values, as described in U.S. Pat. No. 5,305,349 to applicant entitled "Rake Receiver with Quantized Coefficients", which is hereby incorporated by reference in its entirety herein.

Figure 4:
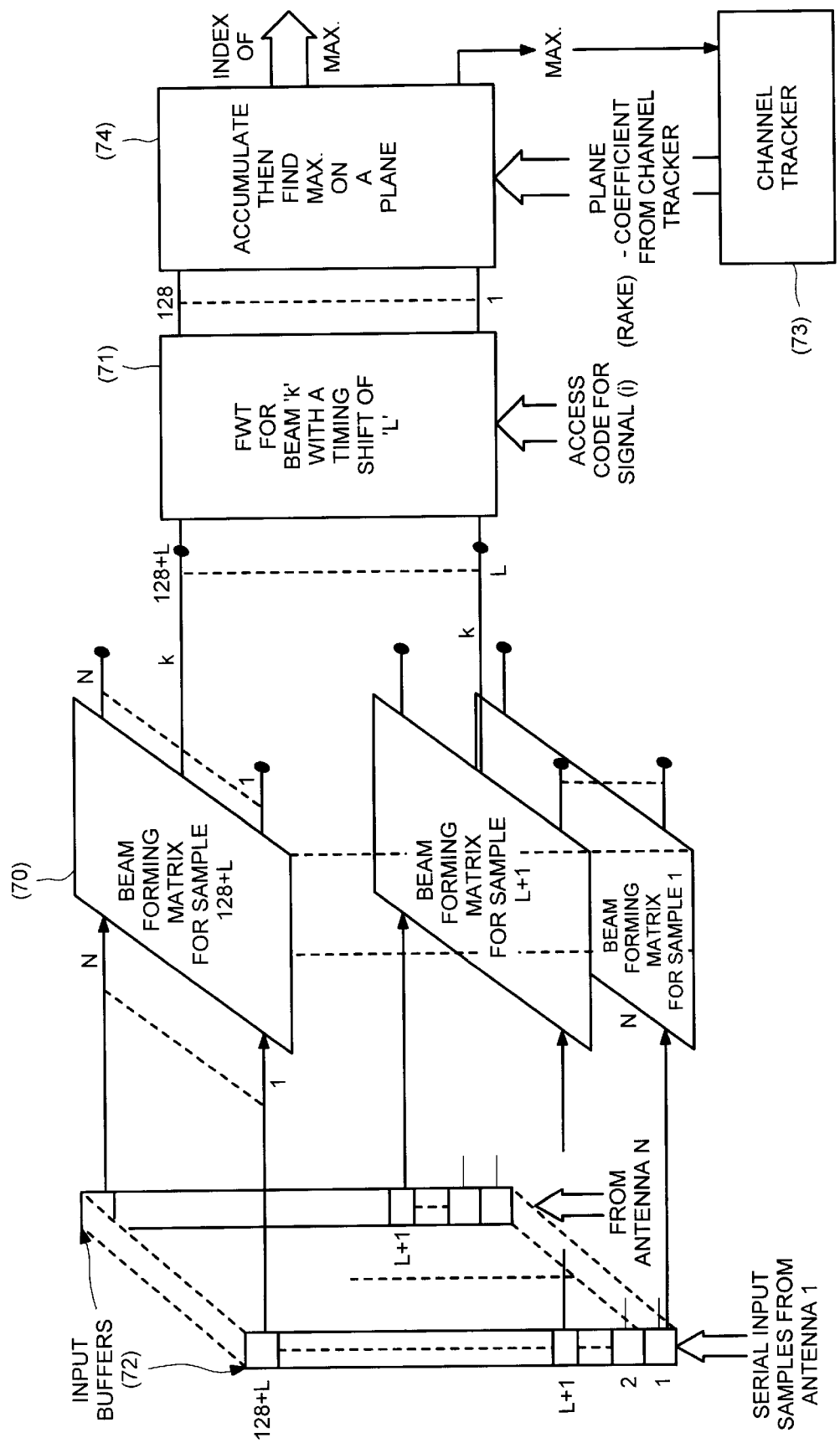
FIG. 4 illustrates ray processing for time-of-arrival and direction-of-arrival combinations according to one embodiment of the present invention.

FIG. 4 illustrates the arrangement for carrying out 2-dimensional transforms on different chip-shifts (RAKE taps) and also how unneeded FWTs may be omitted. The Input buffers 72 receive AtoD converted sample streams from each antenna channel 31 and clock the samples into 128+L storage locations for each channel. The extra "L" locations corresponds to the amount of timing spread expected, expressed in chip periods, between the timing alignment of 128 chips of the latest Walsh code to be received relative to the earliest, the spread being either between two different mobile transmitters located at different distances from the base station or between two different rays that have propagated over different length paths. Corresponding ones of the 128+L buffered sample values from N antenna channel, are connected to an N-input, N-output beamforming matrix and transformed to produce N beam values. The 128+L values output from the beam in which a particular ray of a particular signal is expected to lie are then subject to a selection of those 128 that correspond to a particular timing alignment for a 128-chip Walsh code. The prediction of the beam and the timing of a particular ray is made by a channel tracker 73 which keeps track of the values of maximum correlations for beam directions on either side of the nominal direction of arrival as well as correlations with time shifts on either side, i.e. one chip early and one chip late, of the nominal expected time of arrival. The channel tracker 73 also keeps track of the mean complex value of maximum correlations averaged from one Walsh-Hadamard symbol period to the next, which yield the RAKE coefficient weights for combining different rays. The 128-point Walsh spectrum output from each FWT for a ray of a particular signal is weighted with the complex conjugate of the expected value produced by the channel tracker 73 and added with 128-point weighted vectors for all other rays for the same signal. Each ray has its own timing and may lie in a different beam from other rays of the same signal. Thus, the RAKE combining can combine a set of Walsh correlations for a direct ray received from the South with another set received L chips later from the North, being for example a signal reflection from a large building or mountainside. The channel tracker determines which of the times-of-arrival combined with which directions-of-arrival contain the most energy and combines these signals using for example the aforementioned inventive RAKE combiner having quantized coefficients. The combined signal, due to the complex conjugate weightings, should have its resulting values rotated into the real plane and thus the maximum of the 128 results' real parts is determined by a maximum search circuit 74. In FIG. 4, block 74 also comprises accumulation of the 128-Walsh spectra for all rays using the weighting coefficient supplied by the channel tracker 73. When the largest value has been found, its value is returned to the channel tracker to update the coefficient in time for the next symbol period. The channel tracker will also determine whether that ray shall be used next time or whether another ray has become larger. Implicitly, the circuit of FIG. 4 computes FWTs also for time-of-arrivals and direction-of-arrivals that are not presently significant and therefore do not contribute to the weighted sum, but which are computed in order to determine when or if one of them grows to become greater than one previously contributing to the sum, at which point the larger one will replace the smaller one.

FIG. 4 shows the connections for selecting the RAKE tap or time-of-arrival represented by buffered samples L+1 to 128+L, i.e. the latest possible time-of-arrival. All 128+L time-of-arrivals are shown connected to beamforming matrices, although it is possible to omit beamforming matrices for the time-of-arrivals not used, i.e. for samples 1 to L. Only outputs from beamformers L+1 to 128+L are subjected to an FWT. In this case, the ray of time-of-arrival L+1 is anticipated to be received from direction "k", so only outputs "k" from beamformers L+1 to 128+L are connected to the 128-input FWT 71 to produce a 128-point Walsh spectrum output. This is accumulated in 128 bins in block 74 with the Walsh spectra for all other significant rays, using a weighting coefficient from channel tracker 73. When all rays have been processed, block 74 determines the largest accumulated value and outputs its index as the decoded symbol, and returns the value to the channel tracker. The sequence of 2-dimensional transforms corresponding to each ray is then repeated, to reproduce the FWT values that were accumulated, and after each FWT is reproduced, the value corresponding to the decoded symbol index is set to zero and the inverse FWT performed on the residual values. Then the inverse of the beamforming matrices are applied to return the modified values to input buffers 72 once more. After the just decoded signal has been removed from the buffered values for all significant rays (each defined by a direction-of-arrival plus a time-of-arrival) that signal has vanished from the picture and thus does not interfere with signals subsequently decoded.

In the incorporated references, a preferred way to select the 128-samples from an input buffer 72 corresponding to a particular time-of-arrival is disclosed to be by use of a barrel shifter. A barrel shifter is an efficient way to shift a set of 128 taps up or down across a 128+L set of available tap selections. The desired shift "j" between 0 and L is expressed as a binary integer $$j_0+2j_1+4j_2+8j_3$$

as an example where the maximum value L is 15.

A first stage of the barrel shifter selects 135 taps to comprise either the sample values 1 to 135 or 9 to 143 according as the value of binary digit j3 is 0 or 1. The 135 selected values are then subjected to further selection of 131 values to be either previously selected values 1 to 131 or 5 to 135 according as the value of j2 is 0 or 1. Then those 131 values are subjected to a further selection of 129 values to be either previously selected values 1–129 or 3–131 according to j1. Finally, j0 determines whether previously selected value numbers 1 to 128 or 2 to 129 are selected. The advantage of this approach is that the total number of switch positions is approximately $2*128\log_2(L)$ compared with 128L for 128, L-pole switches, a reduction of approximately 2:1 in complexity for L=15 and greater savings for larger values of L.

It has thus been described how a first signal is decoded and subtracted. After each iteration, a symbol is decoded for a particular mobile and then the access code is changed to be that of the next strongest mobile signal and a new iteration performed. After decoding each signal, the largest value indicative of the symbol is saved. Its complex value is a measure of the phase and amplitude of that signal, and the complex value is averaged in a channel tracker as described in the incorporated references in order to determine in which plane the signal phase lies, and thus to be able to effect coherent detection of the symbol. The magnitude of the tracked value can also be used to predict the signal strength order for the next 128-sample symbol interval and thus to effect re-adaptation of the order of processing to account for different fading on different signals, such that decoding in descending signal strength order is maintained.

The index of the largest FWT component identified after combining all RAKE taps provides the index of the FWT component to be set to zero on the signal subtraction cycle. The machine of FIGS. 3 and 4 thus preferably comprises at least the two distinct phases of:

Detection phase: Calculate FWTs for the time-of-arrival and direction-of-arrivals of rays predicted by the channel tracker from past history to contain significant energy, accumulating the FWTs in 128 bins using channel-tracker-supplied weighting coefficients Then determine the index of the largest accumulated value.

Subtraction phase: Recalculate the same FWTs as above, in descending order of ray strength, and set to zero the component of each with the above index before inverse 2-dimensional transforming the residual values to obtain modified values for performing the next 2-dimensional transform for the ray of next lowest ray strength.

In addition, a third phase which may be termed "search phase" comprises:

Search phase: Perform a 2-dimensional transform for at least one other time-of-arrival and or direction-of-arrival not used in the detection and subtraction phases in order to detect the imminent growth of rays which should in the future be used in detection and subtraction.

In the incorporated references, it is also taught that a fourth phase, termed "reorthogonalization," can be desirable, in which, after processing other signals through phases of detection, subtraction and search, a previous signal-access code is re-used and a new subtraction phase is performed for the previous signal using an already determined index. In other words, the detection phase is omitted because the index of the current symbol is already known. The purpose of the reorthogonalization phase is to reduce residual errors left from a previous signal subtraction phase due to errors in the amount subtracted caused by the presence of other signals. Those errors are proportional to the strengths of the other signals, but correlated with the first signal. After removing the other signals causing the error and therefore originally making it, the error can be detected by performing a new correlation using an FWT. A new subtraction phase then removes the error.

A preferred formulation of the beamforming operation will now be described. A signal incident on the array of ray strength s will result in a vector $\underline{V}$ of antenna column signals 23 of $$\underline{V} = \begin{bmatrix} s \cdot a1 \\ s \cdot a2 \\ \cdot \\ \cdot \\ \cdot \\ s \cdot a(n) \end{bmatrix} = \begin{bmatrix} a1 \\ a2 \\ \cdot \\ \cdot \\ \cdot \\ a(n) \end{bmatrix} \cdot s = \underline{A} \cdot s$$

where $\underline{A}$ is a column vector of the complex values a(i).

How much of the column signal is attributed to s and how much is attributed to the antenna channel gain factors a(i) is somewhat arbitrary, so for reasons that will become clear it is chosen to normalize the values of a1 . . . a(n) such that $$|a1|^2+|a2|^2 \ldots +|a(n)|^2=1$$

To produce a beam that optimally combines the energy from each element to produce maximum directivity towards the signals source of S, the combining weighting coefficients should be equal to the complex conjugates of a(i), that is the combined signal should be $$[a1^*,a2^*,a3^* \ldots a(n)] \cdot \begin{bmatrix} a1 \\ a2 \\ \cdot \\ \cdot \\ \cdot \\ a(n) \end{bmatrix} \cdot s = \underline{A}^\# \cdot \underline{A}s$$

where * signifies complex conjugate and # signifies conjugate transpose.

But $\underline{A}^\# \cdot \underline{A} = |a1|^2 + |a2|^2 \ldots + |a(n)|^2$ which has been set equal to 1 above.

Therefore the result is simply s, indicating that s can be equated with the total signal energy intercepted by the array.

The beam forming matrix B must therefore contain a row equal to A# for the beam needed for receiving S. As yet, the other rows of B are not-defined, but will become so shortly after we impose the additional requirement that, after setting to zero the component in S's beam and multiplying by the inverse of B, the signal S shall have vanished from all antenna element values.

Thus multiplying the vector of received signals $\underline{V}$ by the beamforming matrix B yields $$B \cdot \underline{V} = \begin{bmatrix} s1 \\ s2 \\ \cdot \\ \cdot \\ \cdot \\ s \\ \cdot \\ \cdot \\ \cdot \end{bmatrix}$$

where "s" is the desired signal ray and s1,s2 correspond to other signals or mixtures thereof.

Setting to zero the output corresponding to S is the same as subtracting the vector $$\underline{S} = \begin{bmatrix} 0 \\ 0 \\ \cdot \\ \cdot \\ \cdot \\ s \\ \cdot \\ \cdot \\ 0 \end{bmatrix}$$

from the result.

After multiplying by the inverse of B, we then get $B^{-1} \cdot (B \cdot \underline{V}) = \underline{V} - B^{-1} \cdot \underline{S}$ which should be equal to zero if $B^{-1} \cdot \underline{S}$ cancels the components of S at all antenna elements. Therefore $$B^{-1} \cdot \begin{bmatrix} 0 \\ 0 \\ \cdot \\ \cdot \\ \cdot \\ s \\ \cdot \\ \cdot \\ \cdot \end{bmatrix} = \begin{bmatrix} a1 \\ a2 \\ a3 \\ a(i) \\ \cdot \\ \cdot \\ \cdot \\ a(n) \end{bmatrix} \cdot s \text{ or } B^{-1} \cdot \begin{bmatrix} 0 \\ 0 \\ \cdot \\ \cdot \\ 1 \\ \cdot \\ \cdot \\ 0 \end{bmatrix} = \begin{bmatrix} a1 \\ a2 \\ a3 \\ \cdot \\ \cdot \\ \cdot \\ a(n) \end{bmatrix}$$

The above shows that the column of $B^{-1}$ corresponding to the beam of signal S is equal to the vector of coefficients a(i).

Since $B \cdot B^{-1} = I$, the N×N unit matrix by definition of the inverse, this is consistent with the row of B=(a1*, a2*, a3* ... a(n)*) times the column of B being equal to $|a1|^2 + |a2|^2 ... + |a(n)|^2 = 1$, giving a "1" on the diagonal, but other rows of B times the same column of the inverse must gives zeros, as the off-diagonal elements of the unit matrix I are zero. All other rows of B must therefore be orthogonal to the column of $B^{-1}$ formed by the a(i) values. Denoting any other row of B by (r1, r2 ... r(n)) we must therefore have $$r1 \cdot a1 + r2 \cdot a2 + r3 \cdot a3 \ldots + r(n) \cdot a(n) = 0$$

It can also arbitrarily be required that $r1^2 + r2^2 + r(n)^2 = 1$.

Such a matrix constructed with one row equal to a given vector, all other rows being orthogonal to it and the sum of the moduli squared of any row being equal to unity is called an orthonormal matrix, and may be constructed by the known process of Gram-Schmidt orthonormalization. There are some degrees of freedom in assigning values to the other rows, and if desired as indicated above, this may be done in such a way as to maximize the total number of zeros in the matrix.

Therefore, it has been shown that the beamforming matrix can be constructed by setting one row equal to the conjugates of the received signal gains and phases at the N antenna element columns, the other N−1 rows being constructed by Gram-Schmidt orthonormalization.

Another formulation of the beamformer may be made using Butler matrices or their numerical counterparts, discrete Fourier transforms. A set of signals from the N antenna element columns 20 disposed around the cylinder 21 in a regular fashion is connected to a Butler matrix 80. The Butler matrix 80 produces N transformed signal outputs which are related to the N input signals by an N×N discrete Fourier transform matrix which has the Orthonormal property. When a signal impinges on the array from a direction THETA which is slowly changing, the signal pattern received at the elements slowly moves around the array, becoming identical with the pattern a value 2Pi/N of THETA earlier merely shifted by one element. The Butler-matrix transformed values become equal in amplitude to the values at an earlier value of THETA, THETA−2Pi/N likewise, while the phase shifts of the transformed values are changed by multiples of 2Pi/N. In fact, the amplitudes of the transformed values are very nearly the same for all values of THETA, while only the phase changes by multiples of THETA. Therefore, the desired weighting of the element signals can, to a sufficient accuracy, be provided by means of a constant amplitude shaping performed by applying different gains or attenuation factors c1,c2 ... c(n) in an amplitude shaping unit 81, which also may insert fixed phase changes if necessary for transformed components 1 to N, while a phasing unit 82 changes the phase of each transformed and amplitude-shaped value by multiples of the direction of arrival angle THETA.

Finally, if the phasing unit 82 is chosen to provide the phases necessary for N beams simultaneously that are spaced by multiples of 2Pi/N, then the phasing unit 82 is an inverse Butler matrix (or inverse Fourier transform in the numerical domain).

In FIG. 5 it is shown that the input buffers have been transferred to the outputs of the Butler Matrix unit 80 and the amplitude shaper 81. This is possible because functions performed by the Butler Matrix unit 80 and the amplitude shaper 81 are neither direction-of-arrival nor time-of-arrival dependent and may be performed on a sample-by-sample basis, and the results held in the buffers 72. The barrel shifters (not shown) as described above then select 128 of the 128+L locations of each of the N buffers to form the N inputs to 128 phasing units 82 that complete the beamforming for a ray with a particular time-of-arrival and direction-of-arrival. After signal detection and subtraction, the residual signal need only be inverse transformed as far as input buffers 72 and need not be transformed back through the amplitude shaping unit 81 nor through the Butler matrix 80.

The advantage of performing the fixed transformation of the Butler matrix 80 and the amplitude shaping 81 prior to entering the input buffers illustrated in FIG. 4 is that the beamforming units 70 become simply phasing units 82 that only change the phases of the signals prior to combining them and do not weight the amplitudes. The phasing units 82 may moreover be efficiently implemented using an Fast Fourier Transform (FFT). The FFT produces beams with spacing 2Pi/N from a starting angle THETA that is implemented by applying a fixed phase slope to the input values given by the factors

1, EXP(THETA), EXP(2-THETA), EXP(3-THETA) . . .

where THETA is between 0 and Pi/N, or between −Pi/N and +Pi/N. THETA in this case represents a fine direction-of-arrival resolution to accuracies of less than 2Pi/N while the FFT resolves the beams in steps of 2Pi/N.

FIG. 5 when combined with FIG. 4 exhibits a cascade of FFT processors operating in one dimension of a 2-dimensional array of numbers with FWT processors operating in the second dimension. FWTs and FFTs are both in the family of Walsh-Fourier transforms, that differ only in their application of steps known as "Twiddling". A Fast Walsh-Fourier transform comprises stages for combing pairs of values called "Butterflies" that compute a sum and a difference interspersed with stages for rotating the phases of the complex sum and differences by fixed amounts, called "Twiddling". A pure Fourier transform has twiddling between every two successive Butterfly stages, while a pure Fast Walsh Transform has no Twiddling stages. A hybrid Walsh-Fourier transform has some Twiddling stages; a two dimensional Fourier Transform is one example and omits one twiddling stage. A Fourier transform on a 3-dimensional array of numbers is structured the same as a 1D Fourier transform operating on all the numbers arranged in one big vector, but omits two twiddling stages, and so on, that is M−1 twiddling stages are omitted in performing an M-dimensional Fourier Transform. For the phasing units 82 of FIG. 5 and the FWT processors 71 of FIG. 4, the combined transform may be performed very efficiently by using one large 1-dimensional transform of all 128×N values arranged in a single vector, just omitting 6 twiddling stages corresponding to the 128-point FWT portions, which are equivalent to a seven-dimensional Fourier transform having two data values in each dimension, and omitting a further stage of twiddling corresponding to the 2-dimensional cascade of the FFT with the FWT portion.

An example will make this clearer: Fast Walsh-Fourier transforms may be constructed most efficiently when the total data array comprises a number of values equal to a power of two. Thus, if the number of beams N is chosen to be a power of two, for example 32, since the FWT portion of size 128 is already a power of two, then the total number of data values will be 32×128 or 4096, which is $2^{12}$.

A $2^{12}$ FFT would normally comprise 12 Butterfly stages with 11 Twiddling stages between them. In the present application however, the required transform is an 8-dimensional transform of an 8-dimensional array of values of size 32×2×2×2×2×2×2×2=4096 values in total.

Accordingly, the number of twiddling stages is reduced by 8−1=7, leaving only 4 out of the 11 which a 4096-point FWT can accommodate. The four remaining correspond to those lying between the first 5 Butterfly stages of the 32-point FFT portions.

Thus it has been shown above that the cascade of FFT beamformers 82 in one data plane with FWT decoders 71 in a second data plane may be performed using a generalised single-dimensional Fast Walsh-Fourier transform programmed to delete appropriate stages of twiddling. If such a device is constructed sufficiently, efficiently and economically, it may become uninteresting to omit computation of unused FWTs or beams and simpler to compute the whole set for every ray.

A further variation is to note that the exact beam direction for a ray, formed by customizing the value of THETA in FIG. 5 for each ray independently, is only of relevance in obtaining accurate signal subtraction. Accurate signal detection in the detection phase can be performed by computing only sets of beams using THETA-0, in which case a particular signal happening to have a direction-of-arrival midway between two beams will show up in those two adjacent beams, appearing as two rays. As long as the channel trackers 73 supply appropriate coefficients for the two adjacent beams however, correct detection will result. The subtraction phase however preferably uses the correct value of THETA to cause the signal to appear in only one of the computed beams, from which it is nulled out. The value of THETA required may be determined by the channel tracker from the RAKE coefficients for the two adjacent beams used for detection.

Still other variations comprise, instead of setting a transform component to zero, after updating the channel tracker for the just-detected symbol value to predict the next value, the updated predicted value is subtracted from the transform component before performing the inverse transform.

It is beyond the scope of this application to provide a detailed analysis of all the pro's and con's for one variation or another, the selection of which depends on the exact parameters of a particular implementation, e.g. number of antenna columns, size of Walsh-Hadamard codewords, signal bandwidth, traffic capacity and whether the implementation of computations is by means of programmable signal processors, hardwired logic or Applications-Specific Integrated Circuits (ASIC) the capabilities of which are ever-increasing due to rapid advance in silicon integration technology.

All such variations incorporating the inventive principle of subtractive demodulation of signals in both a signal (or code) space and a spatial dimension (or antenna beam space) that may be made by a person skilled in the art are considered to lie within the scope and spirit of this invention as described by the following claims.

I claim:

1. A communications system comprising a plurality of mobile stations and an improved base station for receiving signals from said mobile stations and decoding information-bearing signals transmitted therefrom, comprising:

antenna means comprising antenna elements disposed around a support structure for receiving signals transmitted from said plurality of mobile stations and generating output signals from each antenna element;

conversion means for amplifying, filtering and converting signals from each of said antenna elements into a corresponding number of converted signals for processing;

storage means for temporarily storing a number of samples of said converted signals; and processing means for iteratively processing and reprocessing said stored samples successively to decode said information from each of said mobile stations in turn, wherein the processing provided by said processing means identifies from said stored samples an information symbol transmitted by one of said mobile stations thereby decoding said information-bearing signal and subtracts values dependent on said identified information symbol from said stored samples thereby reducing interference between the just-decoded signal and the signal to be decoded at a subsequent iteration.

2. The communications system of claim 1, wherein at least some of said mobile stations transmit said information using the same radio frequency channel at the same time.

3. The communications system of claim 1, wherein at least some of said mobile stations transmit Code Division Multiple Access signals.

4. A communications system according to claim 1, wherein said processing means further comprises:
   means for combining corresponding ones of said stored samples converted from respective antenna elements to enhance signals received from a particular direction, wherein a particular one of said mobile stations lies.

5. The communications system of claim 1, wherein said successively decoded signals are selected in descending order of received signal strength.

6. The communications system of claim 4, wherein said means for combining computes a weighted sum of the combined values using as the weights a set of complex beamforming coefficients.

7. The communications system of claim 6, wherein said beamforming coefficients are adapted at each iteration to enhance the signal being decoded at that iteration.

8. The communications system of claim 1, wherein said processing means comprises:
   beamforming means for combining groups of said stored samples comprising a signal sample converted by said conversion means from each antenna at the same instant in time to produce beam samples for signals received from a plurality of directions of arrival at a corresponding instant in time.

9. The communications system of claim 8, further comprising:
   CDMA despreading means for processing said beam samples received at successive instants in time from the same one of said plurality of directions of arrival in order to identify said identified symbol transmitted from one of said mobile station and received at said improved base station from said direction of arrival.

10. The communications system of claim 9, wherein said CDMA despreading means comprises computing a Walsh-Hadamard transform to obtain a number of Walsh spectrum components each corresponding to one of an allowed alphabet of information symbols.

11. The communications system of claim 10, wherein said identified symbol is identified by determining the largest of said Walsh spectrum components and thus the corresponding symbol from said allowed alphabet of symbols.

12. The communications system of claim 11, wherein said largest Walsh spectrum component is set to zero after being determined to be the largest.

13. The communications system of claim 12, wherein said Walsh spectrum after having said largest component set to zero is inverse Walsh-Hadamard transformed to obtain modified beam samples.

14. The communications system of claim 13, wherein said modified beam samples are combined using an inverse beamforming means to obtain modified stored samples which replace the original ones of said stored samples prior to performing a subsequent iteration to decode a symbol from a different mobile transmitter.

15. A communications system comprising a plurality of mobile stations and an improved base station for receiving signals transmitted from said mobile stations each with the aid of an assigned access code and for decoding information symbols belonging to an allowed alphabet of symbols encoded in said transmissions, comprising:
   antenna means comprising antenna elements disposed around a support structure for receiving signals transmitted from said plurality of mobile stations and generating output signals from each antenna element;
   conversion means for amplifying, filtering and converting signals from each of said antenna elements into a corresponding number of converted signals for processing;
   storage means for temporarily storing a number of samples of said signals converted from each of said antenna elements at successive instants in time; and
   two-dimensional numerical transform means for processing said stored samples using one of said access codes assigned to a first one of said mobile stations to produce a two-dimensional array of transformed samples, said transformed samples lying along one dimension of said two-dimensional array corresponding to different possible directions of arrival of signals at said base station transmitted by said first mobile station and transformed samples lying along the other dimension of said two-dimensional array corresponding to correlations with different ones of said information symbols in an allowed alphabet of symbols.

16. The communications system of claim 15, wherein said access code used is chosen to be that assigned to the mobile station that is received with greatest signal strength at said base station.

17. The communications system of claim 15, wherein said decoding of one of said information symbols comprises determining the largest of said transformed samples and thereby identifying a symbol belonging to said allowed alphabet of symbols and also a direction of arrival of the signal, wherein said information symbol was encoded.

18. The communications system of claim 15, wherein said decoding of one of said information symbols comprises combining said transformed samples that lie adjacent along the direction-of-arrival dimension using a set of combining coefficients to produce a combined value for each position in the other dimension of said two dimensional array of transformed samples.

19. The communications system of claim 18 further comprising:
   determining the largest of said combined values and thereby identifying said decoded information symbol.

20. The communications system of claim 17, wherein the largest of said transformed samples is set to zero after identifying said symbol.

21. The communications system of claim 20, further comprising:
   inverse two-dimensional transform means for transforming said transformed samples having one sample set to zero to obtain modified stored samples stored in said storage means.

22. The communications system of claim 21, further comprising:
   means for processing said modified stored samples using said two-dimensional transform means with the access code assigned to a second mobile station and thereby identifying a symbol transmitted by said second mobile station.

23. The communications system of claim 22, wherein after identifying the symbol transmitted by said second mobile station, a corresponding transform component is set to zero and then performing said inverse two-dimensional transform is performed to produce further modified stored samples.

24. The communications system according to claim 23, wherein said further modified samples are iteratively processed using successively selected access codes to identify successively symbols transmitted from mobile stations assigned said access codes and after identifying each symbol to further modify said stored samples by setting to zero a transformed component and performing an inverse transform.

25. The communications system of claim 24, wherein said successively selected access codes are assigned to mobile stations received at said base station in successively descending signal strength order.

26. A communications system comprising a plurality of mobile stations and an improved base station for receiving signals transmitted from said mobile stations each with the aid of an assigned access code and for decoding information symbols belonging to an allowed alphabet of symbols encoded in said transmissions, comprising:

antenna means comprising antenna elements disposed around a support structure for receiving signals transmitted from said plurality of mobile stations and generating output signals from each antenna element;

conversion means for amplifying, filtering and converting signals from each of said antenna elements into a corresponding number of converted signals for processing;

storage means for temporarily storing a number of samples of said signals converted from each of said antenna elements at successive instants in time;

two-dimensional numerical transform means for processing said stored samples using one of said access codes assigned to a first one of said mobile stations to produce a two-dimensional array of transformed samples, said transformed samples lying along one dimension of said two-dimensional array corresponding to different possible directions of arrival of signals at said base station transmitted by said first mobile station and transformed samples lying along the other dimension of said two-dimensional array corresponding to correlating samples with different ones of said information symbols in an allowed alphabet of symbols using a prescribed time-shift between the samples correlated and said information symbols; and means for repeating said two-dimensional transform for a plurality of said time-shifts corresponding to delayed reception of signals from said first mobile station corresponding to delayed echoes of said signals caused by signals reflection from objects in the propagation path.

27. The communications system of claim 26, further comprising:

means to predict the direction of arrival and corresponding time-of-arrival of each of said echoes of significant strength and to adapt thereto said possible different directions of arrival assumed by said two-dimensional numerical transform means and said prescribed time-shifts used for correlation.

28. The communications system of claim 27, further comprising:

combining means for combining using a set of weighting coefficients transformed components corresponding to said predicted directions and times of arrival to obtain a set of combined values corresponding to correlation with each symbol in said allowed alphabet of symbols.

29. The communications system of claim 28, wherein one of said combined values that has the largest magnitude is determined and thereby identifies a symbol transmitted by said first station.

30. The communications system of claim 29, further comprising:

means for setting two zero two-dimensionally transformed components corresponding to said identified symbol and corresponding to said predicted directions and times of arrival and inverse transforming said transformed components after setting said symbol, time and direction-corresponding component to zero to obtain modified stored sample values.

31. The communications system of claim 30, further comprising:

means for iteratively reprocessing said modified stored samples using successively selected access codes to identify in turn a symbol transmitted by the mobile station assigned the selected access code and after each iteration generating further modified stored samples for processing in the next iteration.

32. The communications system of claim 31, wherein said access codes are selected in descending order of received signal strength of the corresponding mobile station to which the access code is assigned.

33. A method for receiving signals transmitted from a plurality of mobile stations, in a communication system comprising said mobile stations and an improved base station, each with the aid of an assigned access code and for decoding information symbols belonging to an allowed alphabet of symbols encoded in said transmissions, comprising the steps of:

receiving signals transmitted from said plurality of mobile stations at antenna means with antenna elements disposed around a support structure and generating output signals from each antenna element;

amplifying, filtering and converting signals from each of said antenna elements into a corresponding number of converted signals for processing;

temporarily storing a number of samples of said signals converted from each of said antenna elements at successive instants in time;

processing said stored samples using one of said access codes assigned to a first one of said mobile stations to produce a two-dimensional array of transformed samples, said transformed samples lying along one dimension of said two-dimensional array corresponding to different possible directions of arrival of signals at said base station transmitted by said first mobile station and transformed samples lying along the other dimension of said two-dimensional array corresponding to correlating samples with different ones of said information symbols in an allowed alphabet of symbols using a prescribed time-shift between the samples correlated and said information symbols; and repeating said two-dimensional transform for a plurality of said time-shifts corresponding to delayed reception of signals from said first mobile station corresponding to delayed echoes of said signals caused by signals reflection from objects in the propagation path.

34. The method according to claim 33, further comprising the step of:

predicting the direction of arrival and corresponding time-of-arrival of each of said echoes of significant strength and to adapt thereto said possible different directions of arrival assumed by said two-dimensional numerical transform means and said prescribed time-shifts used for correlation.

35. The method according to claim 34, further comprising the step of:

combining using a set of weighting coefficients transformed components corresponding to said predicted directions and times of arrival to obtain a set of combined values corresponding to correlation with each symbol in said allowed alphabet of symbols.

36. The method according to claim 35, wherein one of said combined values that has the largest magnitude is determined and thereby identifies a symbol transmitted by said first station.

37. The method according to claim 36, further comprising the step of:

setting two zero two-dimensionally transformed components corresponding to said identified symbol and corresponding to said predicted directions and times of arrival and inverse transforming said transformed components after setting said symbol, time and direction-corresponding component to zero to obtain modified stored sample values.

38. The method according to claim 37, further comprising the step of:

iteratively reprocessing said modified stored samples using successively selected access codes to identify in turn a symbol transmitted by the mobile station assigned the selected access code and after each iteration generating further modified stored samples for processing in the next iteration.

39. The method according to claim 38, wherein said access codes are selected in descending order of received signal strength of the corresponding mobile station to which the access code is assigned.

* * * * *

UNITED STATES PATENT AND TRADEMARK OFFICE
CERTIFICATE OF CORRECTION

PATENT NO. : 5,831,977
DATED : November 3, 1998
INVENTOR(S) : Paul W. Dent

It is certified that error appears in the above-identified patent and that said Letters Patent is hereby corrected as shown below:

Col. 21, line 18
 replace "two zero"
 with --to zero--.

Signed and Sealed this

Twenty-ninth Day of August, 2000

Attest:

Q. TODD DICKINSON

*Attesting Officer*   *Director of Patents and Trademarks*